United States Patent
Lee

(10) Patent No.: US 8,421,758 B2
(45) Date of Patent: Apr. 16, 2013

(54) DISPLAY PANEL AND TOUCH-SENSITIVE DISPLAY MODULE

(75) Inventor: Cheng-Hao Lee, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 1048 days.

(21) Appl. No.: 12/261,509

(22) Filed: Oct. 30, 2008

(65) Prior Publication Data

US 2010/0039397 A1 Feb. 18, 2010

(30) Foreign Application Priority Data

Aug. 13, 2008 (TW) .............................. 97130880 A

(51) Int. Cl.
*G06F 3/041* (2006.01)

(52) U.S. Cl.
USPC ....................................... 345/173; 178/18.01

(58) Field of Classification Search .................. 345/173; 178/18.01; 361/679.01, 679.02
See application file for complete search history.

(56) References Cited

U.S. PATENT DOCUMENTS

| | | | |
|---|---|---|---|
| 8,022,941 B2 * | 9/2011 | Smoot | 345/175 |
| 8,063,888 B2 * | 11/2011 | McFarlane et al. | 345/173 |
| 8,106,889 B2 * | 1/2012 | Chang et al. | 345/173 |

FOREIGN PATENT DOCUMENTS

| | | |
|---|---|---|
| TW | 200401222 | 1/2004 |
| TW | I305623 | 7/2006 |

OTHER PUBLICATIONS

Taiwan Office Action.

* cited by examiner

*Primary Examiner* — Abbas Abdulselam
(74) *Attorney, Agent, or Firm* — Chun-Ming Shih

(57) ABSTRACT

A display panel is adapted to being combined with a touch-sensitive device and being electrically connected to a circuit board. The display panel includes a first body and a first connector. The first body has a display area, a first surface and a second surface. The first surface is opposite to the second surface and the display area is located on the first surface. The first connector is electrically connected to the first body and the first body is adapted to being electrically connected to the circuit board via the first connector. The first body is adapted to being electrically connected to the touch-sensitive device such that the touch-sensitive device is adapted to being electrically connected to the circuit board via the first body and the first connector. Furthermore, a touch-sensitive display module including a display panel and a touch-sensitive device is also provided.

9 Claims, 3 Drawing Sheets

DISPLAY PANEL AND TOUCH-SENSITIVE DISPLAY MODULE

BACKGROUND

1. Field of the Invention

The present invention relates to a display panel, and more particularly, to a display panel applied to a touch-sensitive display module.

2. Description of the Related Art

FIG. 1 is a schematic top view of a conventional touch-sensitive display apparatus. FIG. 2 is a schematic cross-sectional view of the conventional touch-sensitive display apparatus of FIG. 1 along a line A-A. Referring to FIGS. 1 and 2, the conventional touch-sensitive display apparatus 100 includes a display panel 110, a touch panel 120, a circuit board 130 and a casing 140. The display panel 110, the touch panel 120 and the circuit board 130 are disposed in the casing 140. The display panel 110 includes a first body 112, a first connector 114 and a first transmission line 116. The first body 112 has a display area 112a and the first connector 114 is electrically connected to the first body 112 via the first transmission line 116. Furthermore, the first body 112 is electrically connected to the circuit board 130 via the first connector 114.

The touch panel 120 includes a second body 122, a second connector 124 and a second transmission line 126. The touch panel 120 is a resistive touch panel or a capacitive touch panel. The second body 122 is disposed on the display area 112a of the first body 112. The second body 122 and the display area 112a are corresponding to an open 142 of the casing 140. The second connector 124 is electrically connected to the second body 122 via the second transmission line 126. In addition, the second body 122 is electrically connected to the circuit board 130 via the second connector 124.

However, the first transmission line 116 and the second transmission line 126 greatly occupy the space in the casing 140. In addition, since the second body 122 of the touch panel 120 is disposed on the display area 112a of the display panel 110 and a user watches information displayed on the display area 112 through the second body 122 of the touch panel 120, on the whole, the brightness of a frame displayed by the touch-sensitive display apparatus 100 is adversely affected by the touch panel 120.

BRIEF SUMMARY

The present invention is directed to provide a display panel adapted to being combined with a touch-sensitive device such that the combination of the two occupy relatively small space when they are applied to a touch-sensitive display apparatus.

The present invention is directed to provide a touch-sensitive display module which occupies relatively small space when it is applied to a touch-sensitive display apparatus. In addition, the brightness of a frame displayed by the touch-sensitive display module is relatively good.

A display panel in accordance with an embodiment of the present invention is provided. The display panel is adapted to being combined with a touch-sensitive device and being electrically connected to a circuit board. The display panel includes a first body and a first connector. The first body has a display area, a first surface and a second surface. The first surface is opposite to the second surface and the display area is located on the first surface. The first connector is electrically connected to the first body and the first body is electrically connected to the circuit board via the first connector. The first body is adapted to being electrically connected to the touch-sensitive device such that the touch-sensitive device is adapted to being electrically connected to the circuit board via the first body and the first connector.

In an embodiment of the present invention, the display panel further comprises a second connector electrically connected to the first body. The first body is adapted to being electrically connected to the touch-sensitive device via the second connector such that the touch-sensitive device is adapted to being electrically connected to the circuit board via the second connector, the first body and the first connector.

In an embodiment of the present invention, the second connector is disposed on the second surface.

In an embodiment of the present invention, the display panel further comprises a transmission line. The first connector is electrically connected to the first body via the transmission line.

A touch-sensitive display module in accordance with an embodiment of the present invention is provided. The touch-sensitive display module is adapted to being electrically connected to a circuit board. The touch-sensitive display module comprises a display panel and a touch-sensitive device. The display panel comprises a first body and a first connector. The first body has a display area, a first surface and a second surface. The first surface is opposite to the second surface and the display area is located on the first surface. The first connector is electrically connected to the first body and the first body is adapted to being electrically connected to the circuit board via the first connector. The touch-sensitive device is disposed on the first body. The first body is electrically connected to the touch-sensitive device such that the touch-sensitive device is electrically connected to the circuit board via the first body and the first connector.

In an embodiment of the present invention, the display panel further comprises a second connector electrically connected to the first body. The first body is electrically connected to the touch-sensitive device via the second connector such that the touch-sensitive device is adapted to being electrically connected to the circuit board via the second connector, the first body and the first connector.

In an embodiment of the present invention, the second connector is disposed on the second surface.

In an embodiment of the present invention, the touch-sensitive device comprises a second body and a third connector. The third connector is electrically connected to the second body. The first body is electrically connected to the second body by means of the connection between the second connector and the third connector such that the second body is adapted to being electrically connected to the circuit board via the third connector, the second connector, the first body and the first connector. In addition, the second body comprises a plurality of pressure sensors and a base. The pressure sensors and the third connector are disposed on the base. The pressure sensors and the third connector are located between the first body and the base. The pressure sensors are electrically connected to the third connector and corresponding to the display area.

In an embodiment of the present invention, the touch-sensitive device comprises a plurality of pressure sensors and a base. The pressure sensors are disposed on the base and located between the first body and the base. The pressure sensors are electrically connected to the first body and corresponding to the display area.

In an embodiment of the present invention, the display panel further comprises a transmission line and the first connector is electrically connected to the first body via the transmission line.

The touch-sensitive device and the display panel of the embodiment of the present invention are both electrically connected to the circuit board via the first connector. Thus, compared with the conventional art, the touch-sensitive display module of the embodiment of the present invention occupies relatively small space when it is applied to a touch-sensitive display apparatus. In addition, the display area is located on the first surface of the first body and the touch-sensitive device is disposed on the second surface of the first body, and thus, compared with the conventional art, the brightness of a frame displayed by the touch-sensitive display module of the embodiment of the present invention is relatively good.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present display panel and the touch-sensitive display module in detail. The following description is given by way of example, and not limitation.

First Embodiment

Figure 1:
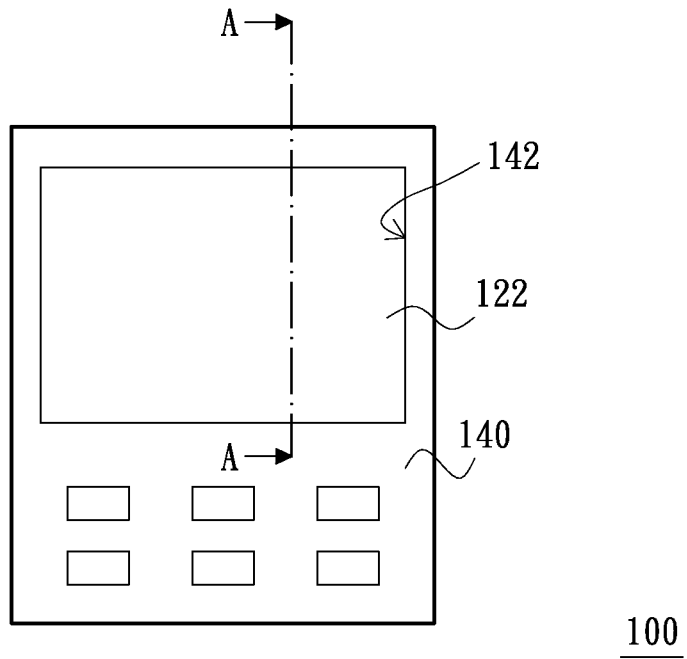
FIG. 1 is schematic top view of a conventional touch-sensitive display apparatus.
Figure 2:
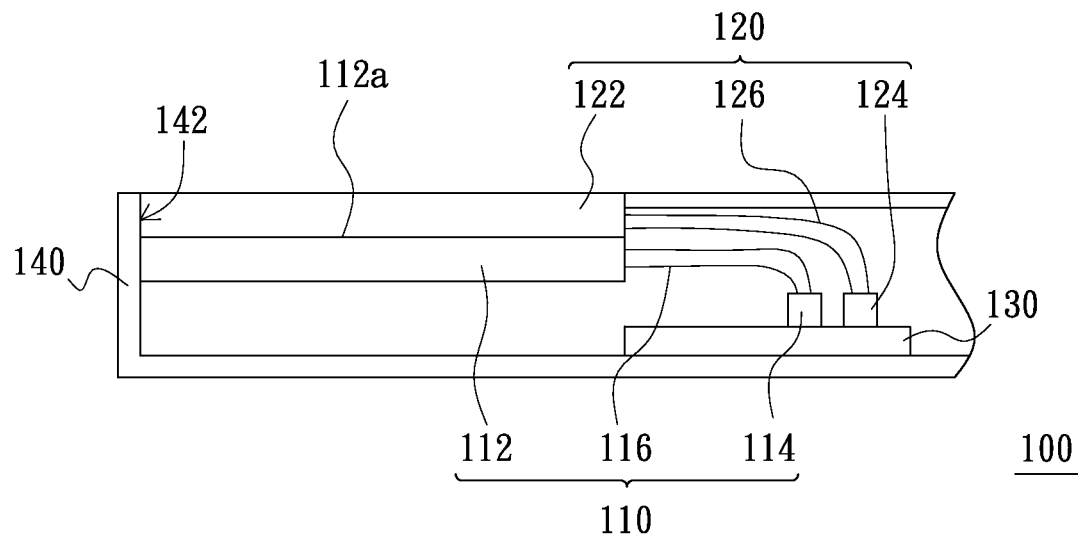
FIG. 2 is a schematic cross-sectional view of the touch-sensitive display apparatus of FIG. 1 along a line A-A.
Figure 3:
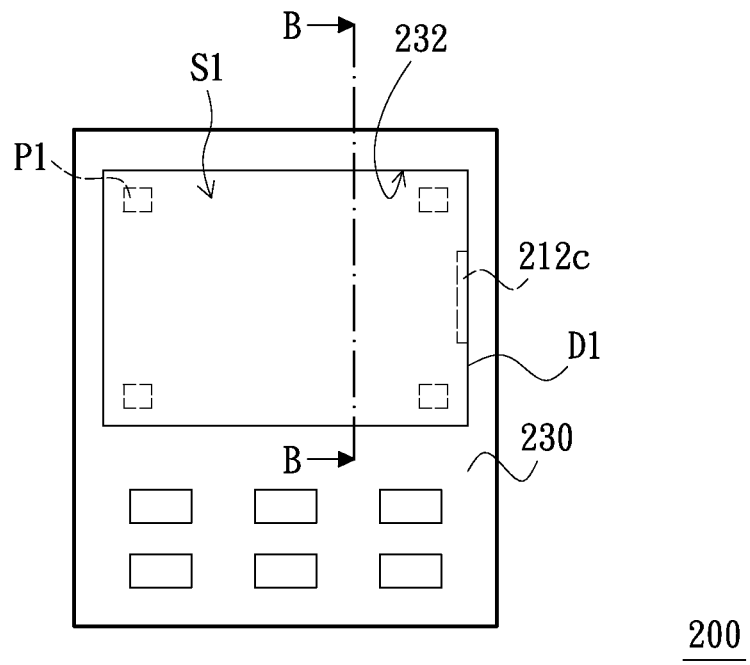
FIG. 3 is a schematic top view of a touch-sensitive display apparatus of a first embodiment of the present invention.
Figure 4:
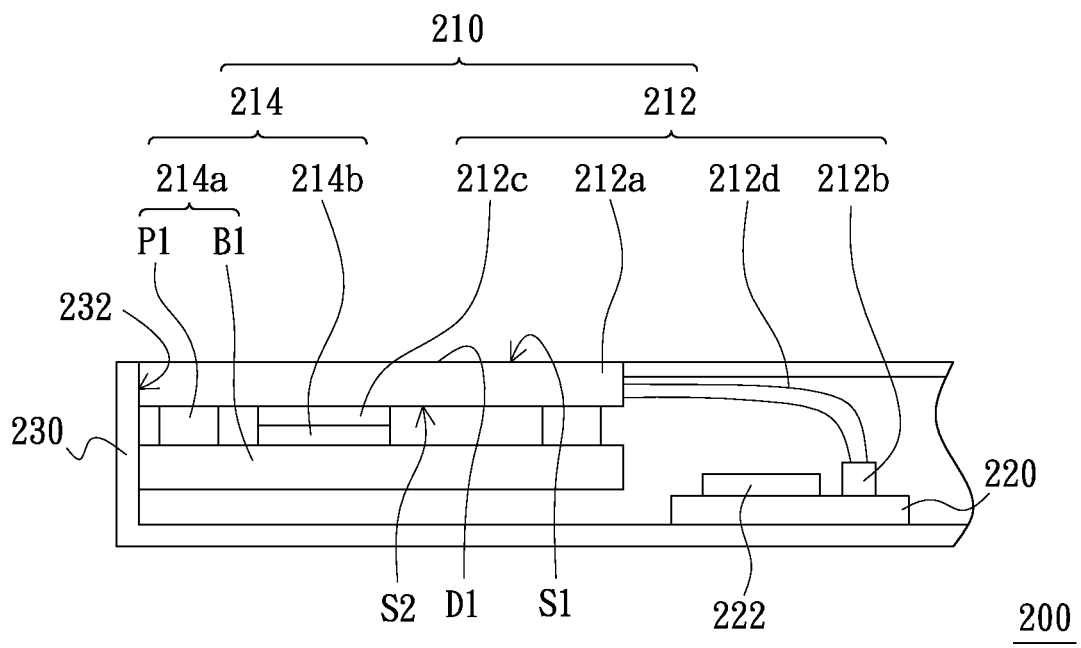
FIG. 4 is a schematic cross-sectional view of the touch-sensitive display apparatus of FIG. 3 along a line B-B.

FIG. 3 is a schematic top view of a touch-sensitive display apparatus of a first embodiment of the present invention. FIG. 4 is a schematic cross-sectional view of the touch-sensitive display apparatus of FIG. 3 along a line B-B. Referring to FIGS. 3 and 4, the touch-sensitive display apparatus 200 of the present embodiment includes a touch-sensitive display module 210, a circuit board 220 and a casing 230. The touch-sensitive display module 210 and the circuit board 220 are disposed in the casing 230 and the touch-sensitive display module 210 is electrically connected to the circuit board 220.

The touch-sensitive display module 210 includes a display panel 212 and a touch-sensitive device 214. The display panel 212 may be an electrophoretic display panel or a liquid crystal display panel. The display panel 212 includes a first body 212a, a first connector 212b, a second connector 212c and a transmission line 212d. The first body 212a has a display area D1, a first surface S1 and a second surface S2. The casing 230 has an open 232 exposing the display area D1. The first surface S1 is opposite to the second surface S2 and the display area D1 is located on the first surface S1. The first connector 212b is electrically connected to the first body 212a via the transmission line 212d. The first body 212a is electrically connected to the circuit board 220 via the transmission line 212d and the first connector 212b. The second connector 212c is disposed on the second surface S2 of the first body 212a and electrically connected to the first body 212a.

The touch-sensitive device 214 is disposed on the first body 212a of the display panel 212. The touch-sensitive device 214 of the present embodiment includes a second body 214a and a third connector 214b. In addition, the second body 214a includes a plurality of pressure sensors P1 and a base B1. The pressure sensors P1 and the third connector 214b are disposed on the base B1. The pressure sensors P1 and the third connector 214b are located between the first body 212a and the base B1 and the pressure sensors P1 are corresponding to the display area D1. The third connector 214b is electrically connected to the pressure sensors P1 of the second body 214a via wires (not shown) of the base B1.

The first body 212a is electrically connected to the touch-sensitive device 214 via the second connector 212c such that the touch-sensitive device 214 is electrically connected to the circuit board 220 via the second connector 212c, wires (not shown) of the first body 212a and the first connector 212b. Concretely, in the present embodiment, the first body 212a is electrically connected to the pressure sensors P1 of the second body 214a by means of the connection between the second connector 212c and the third connector 214b such that the pressure sensors P1 of the second body 214a is electrically connected to the circuit board 220 via the third connector 214b, the second connector 212c and wires (not shown) of the first body 212a, the transmission line 212d and the first connector 212b.

In other words, the first connector 212b has a plurality of pins (not shown). A part of the pins are defined as mediums transmitting electrical signals between the first body 212a of the display panel 212 and the circuit board 220. Another part of the pins are defined as mediums transmitting electrical signals between the pressure sensors P1 and the circuit board 220.

When a user employs a pointer such as a forefinger or a touch pen (not shown) to press the display area D1 to input instructions, the pressure sensors P1 sense the pressure changes in the display area D1 and then convert the pressure changes into electrical signals which are transmitted to the circuit board 220 and processed afterwards by a processor 222 of the circuit board 220.

It should be noted that the touch-sensitive device 214 and the display panel 212 of the present embodiment are both electrically connected to the circuit board 220 via the first connector 212b. Therefore, compared with the conventional art, the touch-sensitive display panel 210 of the present embodiment occupies relatively small space when it is applied to the touch-sensitive display apparatus 200. Furthermore, the display area D1 is located on the first surface S1 of the first body 212a and the touch-sensitive device 214 is disposed on the second surface S2 of the first body 212a, and therefore, compared with the conventional art, the brightness of a frame displayed by the touch-sensitive display apparatus 200 is not adversely affected by the touch-sensitive device 214. In other words, compared with the conventional art, the brightness of the frame displayed by the touch-sensitive display module 210 is relatively good.

It should be noted that the touch-sensitive device 214 may be omitted according to the requirement of a designer. In this condition, part of the pins of the first connector 212b which is designed to transmit the electrical signals between the touch-sensitive device 214 and the circuit board 220 are idle. In other words, the display panel 212 may be applied to another display apparatus (not shown) only having the display function without the touch-sensitive function. Therefore, the display panel 212 of the present embodiment can be applied to the display apparatus independently but the inner circuit of the display panel 212 is not changed such that the display panel 212 facilitates product manufacturing.

Second Embodiment

Figure 5:
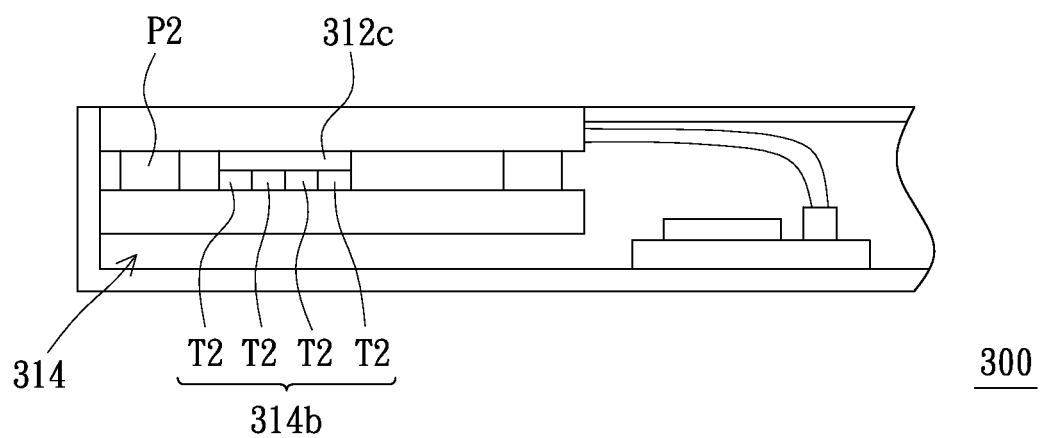
FIG. 5 is a schematic cross-sectional view of a touch-sensitive display apparatus of a second embodiment of the present invention.

FIG. 5 is a schematic cross-sectional view of a touch-sensitive display apparatus of a second embodiment of the present invention. The difference between the touch-sensitive display apparatus 300 of the present embodiment and the touch-sensitive display apparatus 200 of the first embodiment is that the third connector 314b of the touch-sensitive device 314 has a plurality of connecting portions T2 and each of the connecting portions T2 is electrically connected to the corresponding pressure sensor P2. Each of the connecting portions T2 is electrically connected to the second connector 312c of the display panel 312.

Third Embodiment

Figure 6:
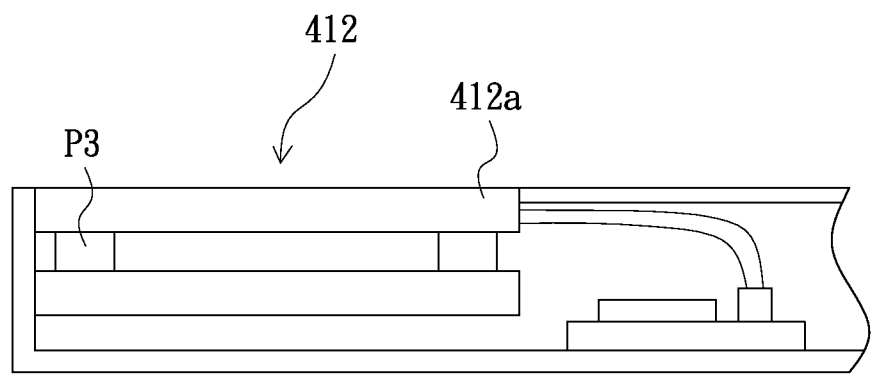
FIG. 6 is a schematic cross-sectional view of a touch-sensitive display apparatus of a third embodiment of the present invention.

FIG. 6 is a schematic cross-sectional view of a touch-sensitive display apparatus of a third embodiment of the present invention. The difference between the touch-sensitive display apparatus 400 of the present embodiment and the touch-sensitive display apparatus 200 of the first embodiment is that the pressure sensors P3 are electrically connected to the first body 412a of the display panel 412 by means of soldering such that the second connector 212c and the third connector 214b of the first embodiment may be omitted.

In summary, the display panel and the touch-sensitive display module of the embodiment of the present invention at least has one of the following advantages or other advantages.

1. The touch-sensitive device and the display panel of the embodiment of the present invention are both electrically connected to the circuit board via the first connector. Thus, compared with the conventional art, the touch-sensitive display module of the embodiment of the present invention occupies relatively small space when it is applied to the touch-sensitive display apparatus.

2. Since the display area is located on the first surface of the first body and the touch-sensitive device is disposed on the second surface of the first body, compared with the conventional art, the brightness of the frame displayed by the touch-sensitive display apparatus is not adversely affected by the touch-sensitive device. In other words, compared with the conventional art, the brightness of the frame displayed by the touch-sensitive display module of the embodiment of the present invention is relatively good.

3. The display panel of the embodiment of the present invention may be applied to another display apparatus independently and but the inner circuit of the display panel is not changed such that display panel facilitates product manufacturing.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display panel adapted to be combined with a touch-sensitive device and electrically connected to a circuit board, comprising:
   a first body having a display area, a first surface and a second surface, the first surface being opposite to the second surface, and the display area being located on the first surface;
   a first connector electrically connected to the first body, the first connector being adapted to be physically connected to the circuit board, the first body being adapted to be electrically connected to the circuit board via the first connector; and
   a transmission line connected between the first connector and the first body, wherein the first body is adapted to be electrically connected to the touch-sensitive device such that the touch-sensitive device is electrically connected to the circuit board via the first body, the transmission line and the first connector.

2. The display panel as claimed in claim 1, further comprising a second connector electrically connected to the first body, the first body being adapted to be electrically connected to the touch-sensitive device via the second connector such that the touch-sensitive device is adapted to be electrically connected to the circuit board via the second connector, the first body and the first connector, wherein the second connector is adapted to be located between the first body and the touch-sensitive device.

3. The display panel as claimed in claim 2, wherein the second connector is disposed on the second surface.

4. A touch-sensitive display module adapted to be electrically connected to a circuit board, comprising:
   a display panel comprising:
      a first body having a display area, a first surface and a second surface, the first surface being opposite to the second surface, and the display area being located on the first surface;
      a first connector electrically connected to the first body, the first connector being adapted to be physically connected to the circuit board, the first body being adapted to be electrically connected to the circuit board via the first connector; and
      a transmission line connected between the first connector and the first body; and
   a touch-sensitive device disposed on the first body, wherein the first body is electrically connected to the touch-sensitive device such that the touch-sensitive device is electrically connected to the circuit board via the first body, the transmission line and the first connector.

5. The touch-sensitive display module as claimed in claim 4, wherein the display panel further comprises a second connector electrically connected to the first body, the first body is electrically connected to the touch-sensitive device via the second connector such that the touch-sensitive device is adapted to be electrically connected to the circuit board via the second connector, the first body and the first connector, and the second connector is located between the first body and the touch-sensitive device.

6. The touch-sensitive display module as claimed in claim 5, wherein the second connector is disposed on the second surface.

7. The touch-sensitive display module as claimed in claim 5, wherein the touch-sensitive device comprises:
   a second body; and
   a third connector electrically connected to the second body, wherein the first body is electrically connected to the second body by means of the connection between the second connector and the third connector such that the second body is adapted to be electrically connected to the circuit board via the third connector, the second connector, the first body and the first connector.

8. The touch-sensitive display module as claimed in claim 7, wherein the second body comprises a plurality of pressure sensors and a base, the pressure sensors and the third connector are disposed on the base, the pressure sensors and the third connector are located between the first body and the base, and the pressure sensors are electrically connected to the third connector and corresponding to the display area.

9. The touch-sensitive display module as claimed in claim 4, wherein the touch-sensitive device comprises a plurality of pressure sensors and a base, the pressure sensors are disposed on the base and located between the first body and the base, and the pressure sensors are electrically connected to the first body and corresponding to the display area.

* * * * *